(12) United States Patent
McCann et al.

(10) Patent No.: US 7,080,870 B1
(45) Date of Patent: Jul. 25, 2006

(54) COLLAPSIBLE BACKREST ASSEMBLY

(76) Inventors: Monty D. McCann, 300 E. Meyer St., Falls City, TX (US) 78113; Michael G. Blanquiz, 4407 Nuggett Peak, San Antonio, TX (US) 78259

( * ) Notice: Subject to any disclaimer, the term of this patent is extended or adjusted under 35 U.S.C. 154(b) by 0 days.

(21) Appl. No.: 11/255,823

(22) Filed: Oct. 24, 2005

(51) Int. Cl.
*B60N 2/005* (2006.01)

(52) U.S. Cl. .................. 296/64; 296/65.02; 296/65.03; 410/149

(58) Field of Classification Search ............... 296/52, 296/53, 55, 68, 65.02, 37.6, 39.2, 65.03, 296/69, 1.07, 64; 297/16.1, 188.04, 226, 297/219.1, 230.1, 256.16, 353, 383, 440.24; 410/145, 149, 118
See application file for complete search history.

(56) References Cited

U.S. PATENT DOCUMENTS

| | | | |
|---|---|---|---|
| 3,799,070 A * | 3/1974 | Munson | 410/149 |
| 3,836,174 A * | 9/1974 | Holman, Jr. | 410/149 |
| D292,950 S | 12/1987 | Fry et al. | |
| 5,000,504 A | 3/1991 | Munguia | |
| 5,104,269 A * | 4/1992 | Hardison | 410/149 |
| 5,192,187 A | 3/1993 | Sweet | |
| 5,215,346 A | 6/1993 | Reitzloff et al. | |
| 5,272,840 A * | 12/1993 | Knoedler et al. | 49/463 |
| 5,427,486 A * | 6/1995 | Green | 410/118 |
| 5,435,616 A * | 7/1995 | Corner | 296/180.1 |
| 5,516,179 A | 5/1996 | Tidwell | |
| 5,533,774 A | 7/1996 | Cavanaugh | |
| 5,971,464 A | 10/1999 | Davis et al. | |
| 6,116,676 A | 9/2000 | Edwards | |
| 6,474,021 B1 * | 11/2002 | Homeyer | 49/57 |
| 6,631,938 B1 | 10/2003 | Burns | |
| 6,651,469 B1 | 11/2003 | Arias | |
| 6,733,220 B1 | 5/2004 | Brown et al. | |
| 2005/0140160 A1 * | 6/2005 | Arias | 296/64 |

* cited by examiner

*Primary Examiner*—Jason Morrow

(57) ABSTRACT

A collapsible backrest assembly includes a panel that has a top edge, a bottom edge, a first lateral edge, a second lateral edge, a front side and a back side. A tube extends into the first lateral edge and outwardly of the second lateral edge. A first rod and a second rod each have a first end extending into opposite ends of the tube. A biasing member is positioned in the tube and biases the first and second rods away from each other. A pair of plates is provided. Each of the plates has a first side and a second side. The second ends of the rods are each attached to one of the first sides of the plates. Each of the plates may be abutted against one of a pair of spaced walls so that the panel is supported between the spaced walls.

8 Claims, 3 Drawing Sheets

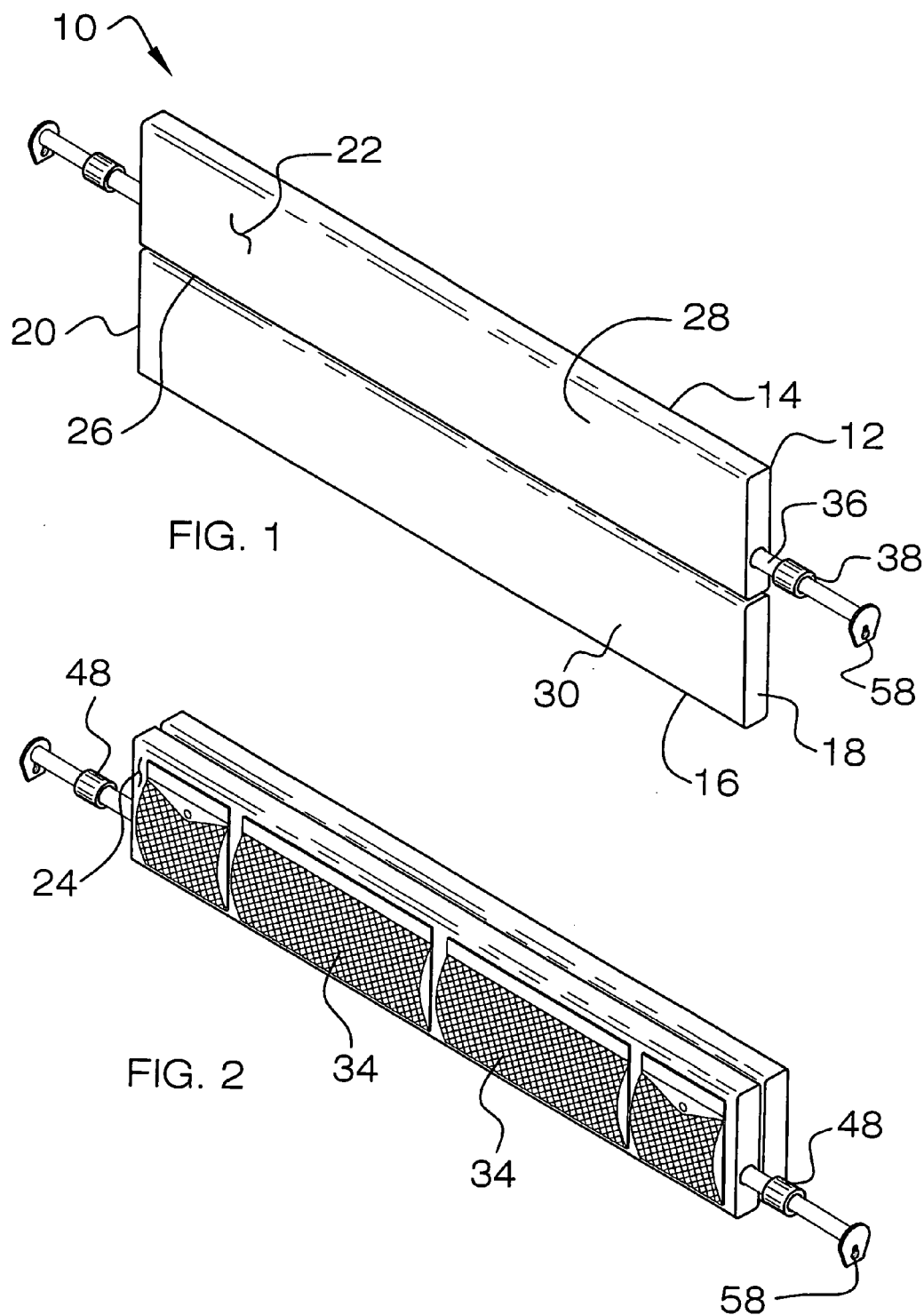

COLLAPSIBLE BACKREST ASSEMBLY

BACKGROUND OF THE INVENTION

1. Field of the Invention

The present invention relates to backrest devices and more particularly pertains to a new backrest device for extending between opposite walls of a vehicle. The walls may include side walls of a pick-up bed or the interior walls of a vehicle such as a minivan, SUV or the like.

2. Description of the Prior Art

The use of tailgate seatback devices is known in the prior art. U.S. Pat. No. 5,971,464 describes a device that can be extended between the side walls of a pickup truck and as such function as a backrest for a person sitting on the tailgate of the pickup truck. Another type of tailgate seatback device is U.S. Pat. No. 5,000,504 having a complete seat construction attachable to a truck tailgate. Another type of seat device for pickup trucks is found in U.S. Pat. No. 5,533,774 that includes a plurality of seat that are hingedly coupled to an outer surface of a pickup truck and which can be folded into the outer surface of the pickup truck when not in use. A seat retainer is shown in U.S. Pat. No. 6,651,469 and a load bracing crossbar is found in U.S. Pat. No. 5,192,187.

While these devices fulfill their respective, particular objectives and requirements, the need remains for a system that provides a seatback for a person sitting on a tailgate of a pickup truck but which may also be used within any vehicle, and in particular SUV type vehicles, by extending it between opposite walls within the vehicle.

SUMMARY OF THE INVENTION

The present invention meets the needs presented above by generally comprising a panel that has a top edge, a bottom edge, a first lateral edge, a second lateral edge, a front side and a back side. A tube extends into the first lateral edge and outwardly of the second lateral edge. The tube has a pair of open ends. A first rod and a second rod each have a first end and a second end. Each of the first ends extends into one of the open ends of the tube and the second ends extend away from the panel. A biasing member is positioned in the tube and biases the first and second rods away from each other. A pair of plates is provided. Each of the plates has a first side and a second side. The second ends of the rods are each attached to one of the first sides of the plates. Each of the plates may be abutted against one of a pair of spaced walls so that the panel is supported between the spaced walls.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective front view of a collapsible backrest assembly according to the present invention.

FIG. 2 is a perspective back view of the present invention.

DESCRIPTION OF THE PREFERRED EMBODIMENT

Figure 3:
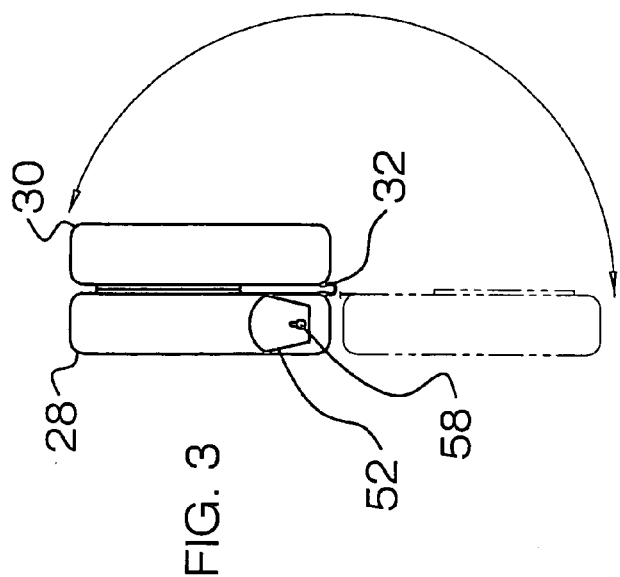
FIG. 3 is an end view of the present invention.
Figure 4:
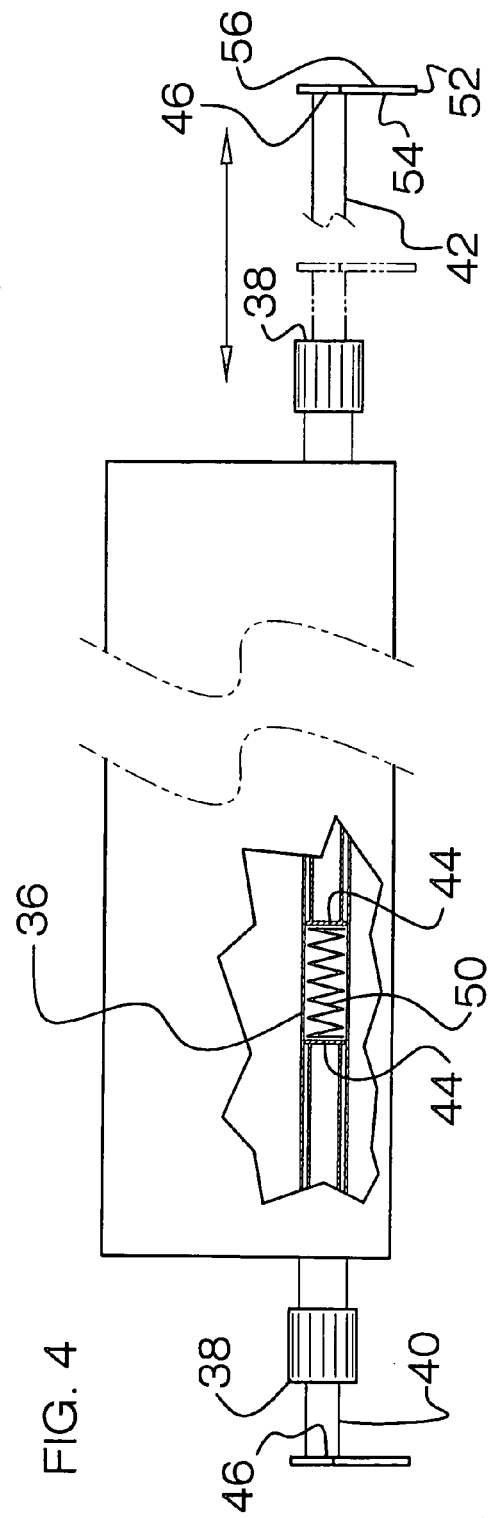
FIG. 4 is a front view of the present invention.
Figure 5:
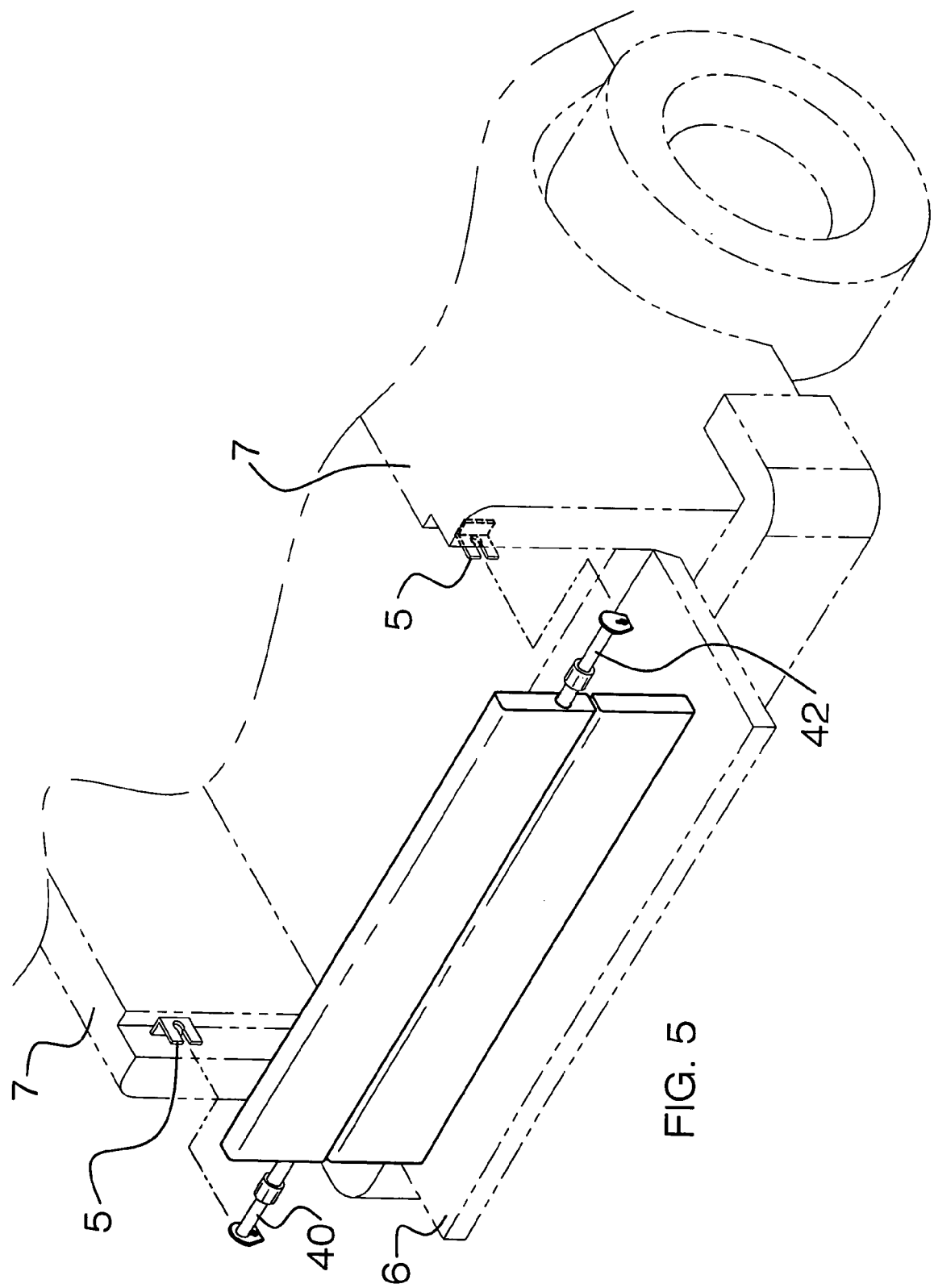
FIG. 5 is a perspective in-use view of the present invention.

With reference now to the drawings, and in particular to FIGS. 1 through 5 thereof, a new backrest device embodying the principles and concepts of the present invention and generally designated by the reference numeral 10 will be described.

As best illustrated in FIGS. 1 through 5, the collapsible backrest assembly 10 generally comprises a panel 12 that has a top edge 14, a bottom edge 16, a first lateral edge 18, a second lateral edge 20, a front side 22 and a back side 24. The panel 12 has a break 26 therein extending between the first 18 and second 20 lateral edges so that an upper portion 28 and a lower portion 30 of the panel 12 is defined. The upper portion 28 is hingedly coupled to the lower portion 30 by a hinge or flexible member 32 so that the back side 24 of the lower portion 30 is abuttable against the back side 24 of the upper portion 28. The panel 12 has a length from the first lateral edge 18 to the second lateral edge 20 generally between 2 feet and 4 feet and a height from the top edge 14 to the bottom edge 16 generally between 6 inches and 24 inches. The panel 12 is preferably covered with or comprised of a resiliently compressible material. A plurality of pockets 34 is attached to the panel 12. The pockets 34 are preferably positioned on the lower portion 30 of the back side 24 of the panel 12.

A tube 36 extends into the first lateral edge 18 and outwardly of the second lateral edge 20. The tube 36 has a pair of open ends 38. A first rod 40 and a second rod 42 are provided. Each of the first 40 and second 42 rods has a first end 44 and a second end 46. Each of the first ends 44 extends into one of the open ends 38 of the tube 36 and each of the second ends 46 extends away from the panel 12. A pair of locking members 48 is provided. Each of the locking members 48 is mounted on the tube 36 and engages one of the first 40 and second 42 rods. The locking members 48 are conventional locking members used to lock telescoping posts together and are configured to selectively inhibit movement one of the rods 40, 42 with respect to the tube 36.

A biasing member 50 is positioned in the tube 36 and biases the first 40 and second 42 rods away from each other. The biasing member 50 preferably comprises a spring positioned between and abutting the first ends 44 of the first 40 and second 42 tubes.

Each of a pair of plates 52 has a first side 54 and a second side 56. Each of the second ends 46 of the rods 40, 42 is attached to one of the first sides 54 of the plates 52. The plates 52 each have an aperture 58 extending therethrough that is configured for receiving a latch pin 5 of a tailgate 6.

In use, each of the plates 52 may be abutted against one of a pair of spaced and parallel walls 7 so that the panel 12 is supported between the spaced walls 7. The spaced walls 7 may be a pair of lateral walls of a pick-up bed in which case the latch pins 5 may also be extended into the apertures 58. If the spaced walls 7 are the opposite spaced walls of a SUV or other vehicle, the biasing member 36 urges the plates 52 against the walls 7. The locking members 38 may be used as needed to retain the rods 40, 42 at a specific length with respect to the panel 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A backrest assembly for removably extending between a pair of spaced walls orientated parallel to each other, said assembly comprising:
    a panel having a top edge, a bottom edge, a first lateral edge, a second lateral edge, a front side and a back side;
    a tube extending into said first lateral edge and outwardly of said second lateral edge, said tube having a pair of open ends;
    a first rod and a second rod, each of said first and second rods having a first end and a second end, each of said first ends extending into one of said open ends of said tube, each of said second ends extending away from said panel;
    a biasing member being positioned in said tube and biasing said first and second rods away from each other;
    a pair of plates, each of said plates having a first side and a second side, each of said second ends of said rods being attached to one of said first sides of said plates; and
    wherein each of said plates may be abutted against one of the spaced walls such that said panel is supported between the spaced walls.

2. The assembly according to claim 1, wherein said panel has a break therein extending between said first and second lateral edges such that an upper portion and a lower portion of said panel is defined, said upper portion being hingedly coupled to said lower portion such that said back side of said lower portion is abuttable against said back side of said upper portion.

3. The assembly according to claim 1, wherein each of said plates has an aperture extending therethrough, said aperture being configured for receiving a latch pin of a tailgate.

4. The assembly according to claim 1, further including a plurality of pockets being attached to said back side of said panel.

5. The assembly according to claim 2, further including a plurality of pockets being attached to said back side of said panel.

6. The assembly according to claim 5, wherein said pockets are positioned on said lower portion.

7. The assembly according to claim 1, further including a pair of locking members, each of said locking members being mounted on said tube and engaging one of said first and second rods, each of said locking members being configured to selectively inhibit movement one of said rods with respect to said tube.

8. A backrest assembly for removably extending between a pair of spaced walls orientated parallel to each other, said assembly comprising:
    a panel having a top edge, a bottom edge, a first lateral edge, a second lateral edge, a front side and a back side, said panel having a break therein extending between said first and second lateral edges such that an upper portion and a lower portion of said panel is defined, said upper portion being hingedly coupled to said lower portion such that said back side of said lower portion is abuttable against said back side of said upper portion, said panel having a length from said first lateral edge to said second lateral edge generally between 2 feet and 4 feet, said panel having a height from said top edge to said bottom edge generally between 6 inches and 24 inches;
    a tube extending into said first lateral edge and outwardly of said second lateral edge, said tube having a pair of open ends;
    a first rod and a second rod, each of said first and second rods having a first end and a second end, each of said first ends extending into one of said open ends of said tube, each of said second ends extending away from said panel;
    a biasing member being positioned in said tube and biasing said first and second rods away from each other, said biasing member comprising a spring;
    a pair of plates, each of said plates having a first side and a second side, each of said second ends of said rods being attached to one of said first sides of said plates, each of said plates having an aperture extending therethrough, said aperture being configured for receiving a latch pin of a tailgate;
    a plurality of pockets being attached to said back side of said panel, said pockets being positioned on said lower portion;
    a pair of locking members, each of said locking members being mounted on said tube and engaging one of said first and second rods, each of said locking members being configured to selectively inhibit movement one of said rods with respect to said tube; and
    wherein each of said plates may be abutted against one of the spaced walls such that said panel is supported between the spaced walls.

* * * * *